United States Patent
Martwick

Patent Number: 6,145,030
Date of Patent: Nov. 7, 2000

[54] SYSTEM FOR MANAGING INPUT/OUTPUT ADDRESS ACCESSES AT A BRIDGE/MEMORY CONTROLLER

[75] Inventor: Andrew Martwick, Folsom, Calif.

[73] Assignee: Intel Corporation, Santa Clara, Calif.

[21] Appl. No.: 09/049,829

[22] Filed: Mar. 27, 1998

[51] Int. Cl.[7] .......................... G06F 13/24; G06F 13/12; G06F 13/14; G06F 12/10; G06F 13/10
[52] U.S. Cl. .................. 710/36; 710/48; 710/15; 710/17; 710/18; 710/260; 711/202
[58] Field of Search .................. 710/36, 260, 9, 710/261, 263, 18, 15, 17, 19; 712/200, 244, 36; 364/200; 395/500, 839, 733, 392; 711/207, 202; 703/23; 717/4

[56] References Cited

U.S. PATENT DOCUMENTS

| | | | |
|---|---|---|---|
| 4,163,280 | 7/1979 | Mori et al. | 711/207 |
| 4,695,945 | 9/1987 | Irwin | 364/200 |
| 4,920,481 | 4/1990 | Binkley et al. | 364/200 |
| 5,560,018 | 9/1996 | Macon, Jr. et al. | 710/260 |
| 5,628,029 | 5/1997 | Evoy | 710/18 |
| 5,644,755 | 7/1997 | Wooten | 703/23 |
| 5,682,512 | 10/1997 | Tetrick | 711/202 |
| 5,708,815 | 1/1998 | Poisner | 710/263 |
| 5,745,770 | 4/1998 | Thangadurai et al. | 395/733 |
| 5,764,999 | 6/1998 | Wilcox et al. | 710/261 |
| 5,796,984 | 8/1998 | Pearce et al. | 395/500 |
| 5,832,299 | 11/1998 | Wooten | 710/9 |
| 5,864,692 | 1/1999 | Faraboschi et al. | 395/392 |
| 5,884,082 | 3/1999 | Seidel et al. | 717/4 |
| 5,903,773 | 5/1999 | Richardson et al. | 395/839 |

Primary Examiner—Thomas C. Lee
Assistant Examiner—Katharina Schuster
Attorney, Agent, or Firm—Blakely, Sokoloff, Taylor & Zafman LLP

[57] ABSTRACT

An apparatus includes an input/output (I/O) address verification unit that determines whether an I/O address received from a processor is protected. An interrupt generator is coupled to the I/O address verification unit. The interrupt generator generates an interrupt if the I/O address is protected. An interrupt recorder is coupled to the address verification unit. The interrupt recorder records a cause of the interrupt.

14 Claims, 5 Drawing Sheets

SYSTEM FOR MANAGING INPUT/OUTPUT ADDRESS ACCESSES AT A BRIDGE/MEMORY CONTROLLER

FIELD OF THE INVENTION

The present invention relates to the field of computer systems. More specifically, the present invention relates to a method and apparatus for trapping accesses to input/output (I/O) addresses.

BACKGROUND OF THE INVENTION

In computer systems, processors typically communicate with I/O functions using memory-mapped I/O or I/O addressing. An I/O function is a specific job that an I/O device performs. An I/O device may host a plurality of I/O functions. The memory-mapped I/O scheme involves assigning portions of the memory to I/O functions as address spaces. Reads and writes to those addresses in memory are interpreted as commands to the I/O function. The I/O addressing scheme involves utilizing dedicated I/O instructions in the processor. These I/O instructions can specify an I/O function, through an I/O address, and a command to the I/O function. The processor communicates the I/O address via a set of wires normally included as part of the I/O bus. The command to the I/O function is transmitted over the data lines in the I/O bus.

The I/O addresses of I/O functions are typically written in the Basic Input/Output System (BIOS) that corresponds to the platform of the computer system, an operating system installed in the computer system, and device drivers written for the I/O functions. Computer systems using an I/O addressing scheme rely on the BIOS, the operating system, and device drivers to provide the processor with the correct I/O addresses to the I/O functions in the computer system. A problem occurs when a computer system is configured with a BIOS, operating system, or device driver that does not correspond to the platform of the computer system or when an I/O function is no longer at an I/O address that the BIOS, operating system, or device driver indicates. In these situations, an error would occur when the processor attempts to access an I/O function that does not exist at the I/O address indicated by the BIOS.

SUMMARY

An apparatus according to an embodiment of the present invention is disclosed. The apparatus includes an input/output (I/O) address verification unit that determines whether an I/O address received from a processor is protected. An interrupt generator is coupled to the I/O address verification unit. The interrupt generator generates an interrupt if the I/O address is protected. An interrupt recorder is coupled to the address verification unit. The interrupt recorder records a cause of the interrupt.

BRIEF DESCRIPTION OF THE DRAWINGS

The present invention is illustrated by way of example and not by way of limitation in the figures of the accompanying drawings, in which the like references indicate similar elements and in which.

DETAILED DESCRIPTION

Figure 1:
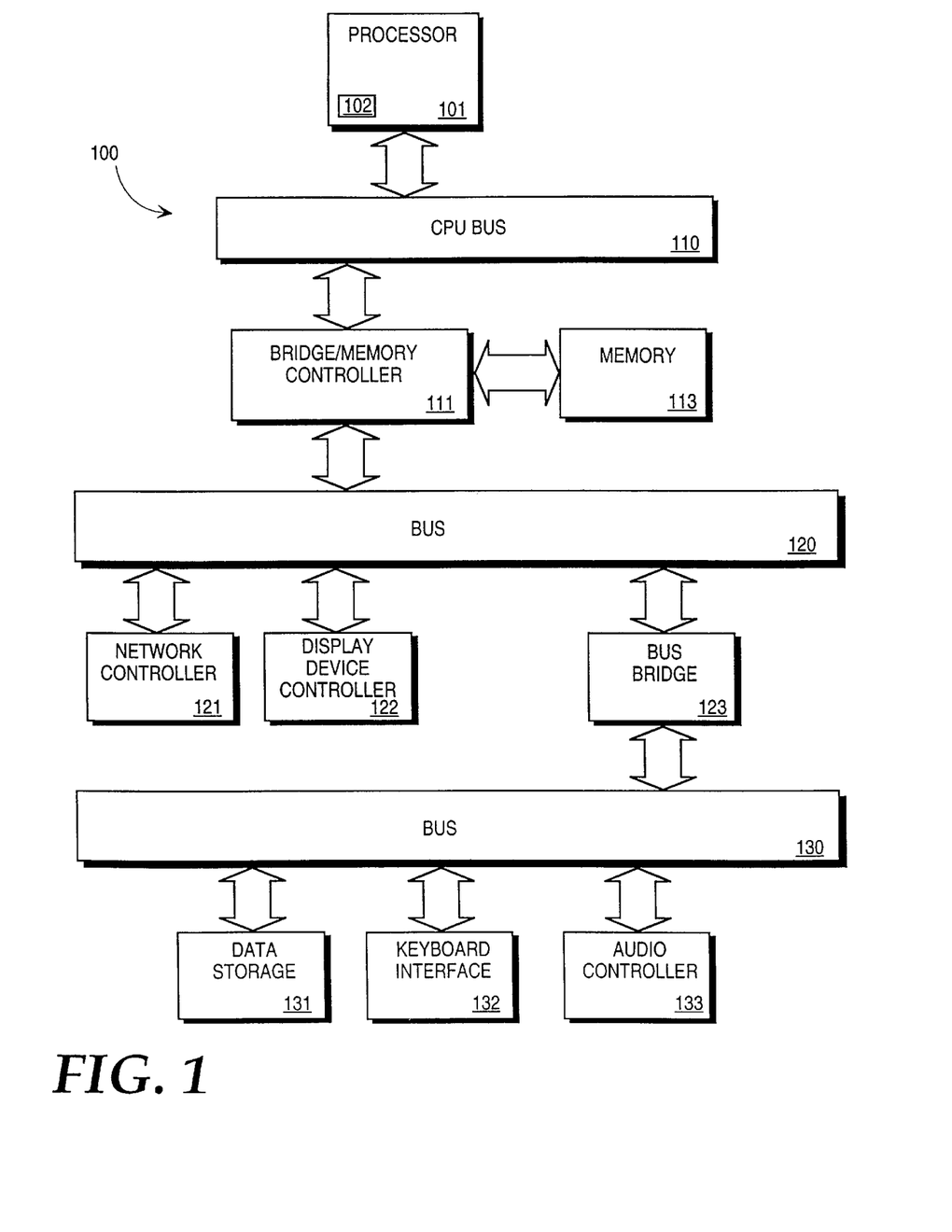
FIG. 1 is a block diagram of a computer system implementing an embodiment of the present invention.

FIG. 1 illustrates a computer system 100 upon which an embodiment of the resent invention can be implemented. The computer system 100 includes a processor 101 that processes data signals. The processor 101 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 1 illustrates an example of the present invention implemented on a single processor computer system 100. However, it is understood that the present invention may be implemented in a computer system having multiple processors. The processor 101 is coupled to a CPU bus 110 that transmits data signals between processor 101 and other components in the computer system 100.

The computer system 100 additionally includes a memory 113. As an example, memory 113 may be a dynamic random access memory (DRAM) device, a static random access memory (SRAM) device, or other memory device. The memory 113 may store instructions and code represented by data signals that may be executed by the processor 101. A cache memory 102 resides inside processor 101 that stores data signals stored in memory 113. The cache 102 speeds up memory accesses by the processor 101 by taking advantage of its locality of access. In an alternate embodiment of the computer system 100, the cache 102 resides external to the processor 101.

A bridge memory controller 111 is coupled to the CPU bus 110 and the memory 113. The bridge memory controller 111 directs data signals between the processor 101, the memory 113, and other components in the computer system 100 and bridges the data signals between the CPU bus 110, the memory 113, and a first I/O bus 120.

The first I/O bus 120 may be a single bus or a combination of multiple buses. As an example, the first I/O bus 120 may comprise a Peripheral Component Interconnect (PCI) bus, a Personal Computer Memory Card International Association (PCMCIA) bus, a NuBus, or other buses. The first I/O bus 120 provides communication links between components in the computer system 100. A network controller 121 links the computer system 100 to a network of computers (not illustrated in FIG. 1) and supports communication among the machines. A display device controller 122 is coupled to the first I/O bus 120. The display device controller 122 allows coupling of a display device to the computer system 100 and acts as an interface between the display device and the computer system 100. The display device controller may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 101 through the display device controller 122 and displays the information and data signals to the user of the computer system 100.

A second I/O bus 130 may be a single bus or a combination of multiple buses. As an example, the second I/O bus 130 may comprise a PCI bus, a PCMCIA bus, a NuBus, an Industry Standard Architecture (ISA) bus, or other buses. The second I/O bus 130 provides communication links between components in the computer system 100. A keyboard interface 132 is coupled to the second I/O 130. The keyboard interface may be a keyboard controller or other keyboard interface. The keyboard interface 132 may be a dedicated device or can reside in another device such as a bus controller or other controller. The keyboard interface 132 allows coupling of a keyboard to the computer system 100 and transmits data signals from a keyboard to the computer system 100. A data storage device 131 is coupled to the second I/O bus 130. The data storage device 131 may be a hard disk drive, a floppy disk drive, a CD-ROM device, a flash memory device or other mass storage device. An audio controller 133 is coupled to the second I/O bus 130. The audio controller 133 operates to coordinate the recording and playing of sounds is also coupled to the I/O bus 130.

A bus bridge 123 couples the first I/O bus 120 to the second I/O bus 130. The bus bridge 123 operates to buffer and bridge data signals between the first I/O bus 120 and the second I/O bus 130.

According to an embodiment of the computer system 100, the processor 101 communicates with I/O functions in the computer system 100 using an I/O addressing scheme. Each of the computer system components including the bridge memory controller 111, memory 113, network controller 121, display device controller 122, bus bridge 123, data storage 131, keyboard interface 132, and the audio controller 133 include at least one I/O function that is defined as a specific job that the component performs. Each of the I/O functions has a designated I/O address. According to an embodiment of the present invention, the processor 101 obtains the I/O addresses of the I/O functions in the computer system 100 from a BIOS, an operating system, or a device driver in the memory 113. The processor 101 uses the I/O addresses to direct instructions and commands to the I/O functions. According to an embodiment of the present invention, instructions originating from the processor 101 that targets I/O addresses are routed to the bridge memory controller 111 before they are forwarded to their corresponding I/O functions. The bridge memory controller 111 checks the I/O addresses to determine whether the I/O addresses are protected. If an I/O address is protected, an interrupt is generated and the instruction is not forwarded to the I/O function at the I/O address. If an I/O address is not protected, the instruction is forwarded to the I/O function at the I/O address.

Figure 2:
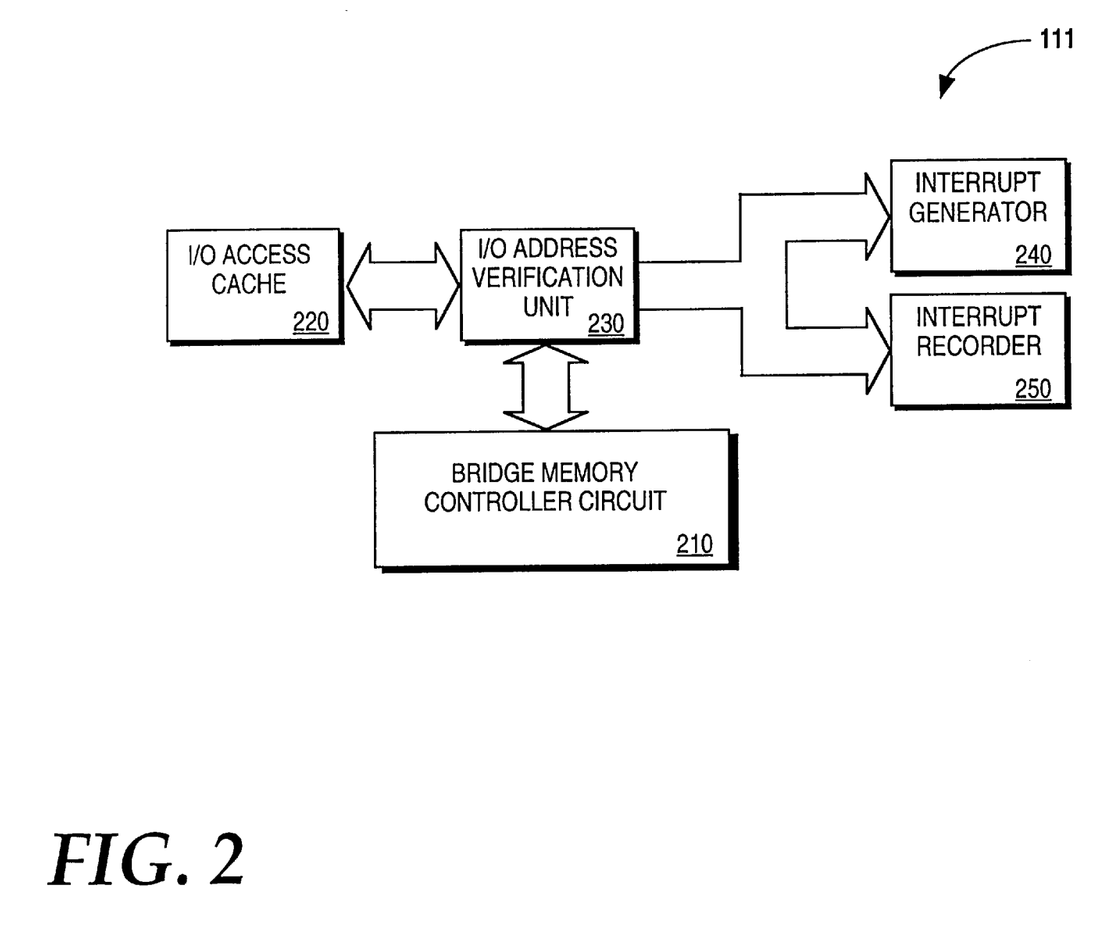
FIG. 2 is a block diagram of a bridge memory controller according to an embodiment of the present invention.

FIG. 2 is a block diagram of the bridge memory controller 111 according to an embodiment of the present invention. The bridge memory controller 111 includes a bridge memory controller circuit 210. The bridge memory controller circuit 210 directs data signals among the processor 101 (shown in FIG. 1), the memory 113 (shown in FIG. 1), and other components in the computer system 100 (shown in FIG. 1) and bridges the data signals among the CPU bus 110 (shown in FIG. 1) and the memory 113 and the first I/O bus 120 (shown in FIG. 1). It should be appreciated that the bridge memory controller circuit 210 may include other I/O functions.

An I/O address verification unit 230 is coupled to the bridge memory controller circuit 210. The I/O address verification unit 230 receives an I/O address from an instruction originating from the processor 101. The I/O address verification unit 230 verifies whether the I/O address is protected. According to an embodiment of the present invention, an /O address is protected when an I/O function is not at the I/O address indicated by the BIOS, operating system, or device driver and accessing the function at the incorrect I/O address would result in an error. According to an embodiment of the bridge memory controller 111, the I/O address verification unit 230 verifies whether an I/O address is protected by reading information in an I/O protection map stored in the main memory 113. According to an embodiment of the present invention, the I/O protection map is stored in the System Management Mode (SMM) section of the main memory 113. It should be appreciated that the I/O protection map may reside in an area other than the SMM section of the main memory 113. The I/O protection map may reside, for example, in other areas in the main memory 113 or in a storage medium other than the main memory 113. If the I/O address verification unit 230 determines that an I/O address is protected, the I/O address is trapped and the instruction is not forwarded to the I/O address. If the I/O address verification unit 230 determines that an I/O address is not protected, the instruction is forwarded to the I/O address.

An interrupt generator 240 is coupled to the I/O address verification unit 230. The interrupt generator 240 operates to generate an interrupt signal to the processor 101 when the I/O address verification unit 230 determines that an I/O address in an instruction received from the processor 101 is protected. According to an embodiment of the present invention, the interrupt signal is a System Management Interrupt signal. According to an embodiment of the interrupt generator 240, the interrupt generator 240 includes an output pin that outputs a signal to the processor 101.

An interrupt recorder 250 is coupled to the I/O address verification unit 230. When the I/O address verification unit 230 determines that an I/O address is protected, the I/O address verification unit 230 writes a message that identifies the cause of the interrupt in the interrupt recorder 250. According to an embodiment of the present invention, the interrupt recorder 250 includes a register and the I/O address verification unit 230 writes the protected I/O address in the interrupt recorder 250 to identify the cause of the interrupt.

According to an embodiment of the bridge memory controller 111, an I/O access cache 220 is coupled to the I/O address verification unit 230. In this preferred embodiment, the I/O address verification unit 230 verifies whether an I/O address is protected by first reading information in an I/O protection map stored in the I/O access cache 250. If the I/O protection map in the I/O access cache 220 does not have information regarding the I/O address, the I/O address verification unit 230 proceeds to read the I/O protection map in the SMM section in the main memory 113. After the section in the I/O protection map in the main memory 113 that contains information about the I/O address is read, that section of the I/O protection map is written in the I/O access cache 220. The I/O access cache 220 speeds up accesses of the I/O protection map by the I/O address verification unit 230 by taking advantage of its locality of access inside the bridge memory controller 111.

According to an embodiment of the present invention, the bridge memory controller circuit 210, the I/O access cache 220, the I/O address verification unit 230, the interrupt generator 240, and the interrupt recorder 250 all reside on a same silicon substrate. It should be appreciated that the I/O access cache 220, the I/O address verification unit 230, the interrupt generator 240, and the interrupt recorder 250 may reside external to the bridge memory controller 111. The bridge memory controller circuit 210, the interrupt recorder 250, the I/O address verification unit 230, the interrupt generator 240, and the I/O access cache 250 may be implemented by any known circuitry or technique.

In response to receiving the interrupt from the interrupt generator 240, the processor 101 executes an interrupt service routine. According to an embodiment of the present invention, the interrupt service routine is a program stored in a section of the main memory 113 designated for storing SMM code. The interrupt service routine accesses the interrupt recorder 250 to determine the cause of the interrupt. Upon reading the contents written in the interrupt recorder 250, the interrupt service routine performs a task appropriate for servicing the cause of the interrupt.

Figure 3:
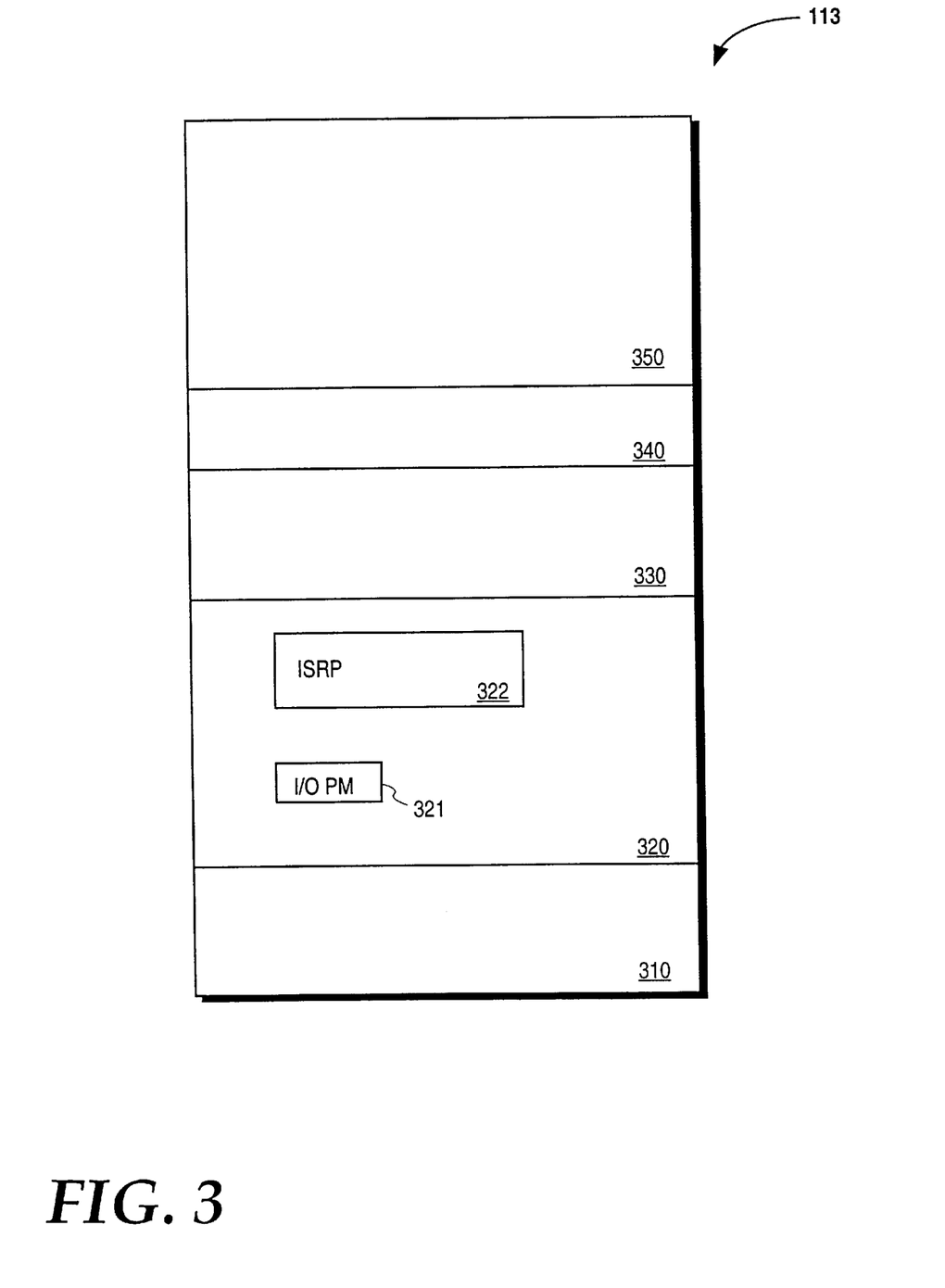
FIG. 3 is a block diagram of a memory according to an embodiment of the present invention.

FIG. 3 is a block diagram of the main memory 113 according to an embodiment of the present invention. The main memory 113 includes a plurality of sections allocated for storing information. Block 310 represents a first section in the main memory 113. The first section 310 may be used for storing real mode data. The real mode data may include an operating system program used for managing the resources of the computer system 100 (shown in FIG. 1) by scheduling and allocating hardware resources and software resources.

Block 320 represents a second section of the main memory 113. The second section 320 may be used for storing SMM code used for performing power management tasks in the computer system 100. According to an embodiment of the present invention, an I/O protection map 321 and an interrupt service routine program 322 are stored in areas in the second section 320. According to an embodiment of the I/O protection map 321, the I/O protection map 321 is an 8K space in the second section 320 in the main memory 113. Each bit in the I/O protection map corresponds to a unique I/O address. According to an embodiment of the I/O protection map a zero in a bit corresponding to an I/O address indicates that the I/O address is protected and a one in a bit corresponding to an I/O address indicates that the I/O address is not protected. The interrupt service routine program 322 includes instructions, which when executed by the processor, causes the processor to read the interrupt recorder 250 (shown in FIG. 2) to determine a cause of the interrupt and to service the interrupt appropriately according to the information read from the interrupt recorder 250.

According to an embodiment of the present invention, the interrupt service routine program 322 includes instructions that redirect instructions targeted to a first I/O address to a second I/O address. In this embodiment of the present invention, the interrupt routine service routine program 322 may include a table of I/O addresses provided by the BIOS, the operating system, or device driver that do not properly correspond to I/O functions in the computer system 100. The table of I/O address may include a list of correct I/O addresses that correspond to the I/O functions. Redirecting instructions targeted to I/O addresses allows the processor 101 to access a desired I/O function whether or not the I/O address provided to the processor 101 from the BIOS is correct. This allows the computer system 100 to run any version of a BIOS without the danger of mismatching an I/O address with an I/O function.

According to an embodiment of the present invention, the interrupt service routine program 322 includes instructions that allow an I/O function to be emulated. In a situation where the computer system 100 has been reconfigured and I/O functions have been removed or replaced, the present invention allows the processor 101 to direct instructions to an emulated I/O function which appears to reside at the targeted I/O address.

According to a first embodiment of the interrupt service routine program 322 where an I/O function is emulated, a direct memory access (DMA) controller is emulated. The I/O address of the DMA controller is indicated as protected in the I/O protection map 321 so that when the processor 101 attempts to access the DMA controller, the interrupt generator 240 (shown in FIG. 2) generates an interrupt and the interrupt recorder 250 (shown in FIG. 2) records a message that identifies the cause of the interrupt. The interrupt service routine program 322 reads the message in the interrupt recorder 250 and from the message determines that an interrupt was generated because the processor 101 attempted to access the I/O address of the DMA controller. The interrupt service routine program 322 proceeds to communicate with the processor 101 via its operating system as if it were the DMA controller. The interrupt service routine program 322 prompts the processor 101 for a source address, destination address, and length information of data that is to be moved. This information would be written in main memory 113 instead of to a DMA controller. The data would then be moved by the interrupt service routine program 322 instead of the DMA controller.

According to a second embodiment of the interrupt service routine program 322 where an I/O function is emulated, a floppy drive controller for a floppy drive is emulated. The I/O address of the floppy drive controller is indicated as protected in the I/O protection map 321 so that when the processor 101 attempts to access the floppy drive controller, the interrupt generator 240 generates an interrupt and the interrupt recorder 250 records a message that identifies the cause of the interrupt. The interrupt service routine program 322 reads the interrupt recorder 250 and from the message determines that an interrupt was generated because the processor 101 attempted to access the I/O address of the floppy drive controller. The interrupt service routine program 322 proceeds to communicate with the processor 101 via its operating system as if it were the floppy drive controller. The interrupt service routine program 322 prompts the processor 101 for a source address, destination address, and length information of data that is to be transferred between the floppy drive and another location. This information would be written in main memory 113 instead of the floppy drive controller. In the situation where a floppy drive is on the computer system 100, the interrupt service routine program 322 would transfer the data between the floppy drive and the other location. In the situation where a floppy drive does not exist in the computer system but has been replaced with another storage medium such as an Integrated Drive Electronic (IDE) drive or a removable storage medium connected to an IDE port or a parallel port for example, the interrupt service routine program 322 would transfer the data between the IDE drive and the other location. It should be appreciated that other I/O functions in addition to the floppy drive controller and DMA controller may be emulated. For example, timers, video controllers, game ports, serial ports, parallel ports, and audio ports may be emulated.

In a preferred embodiment of the present invention, the interrupt service routine 322 may redirect I/O accesses, emulate an I/O function in the computer system 100, or do both as required to service the interrupt generated. By redirecting I/O accesses and emulating functions in the computer system 100, the present invention allows the processor 101 to communicate with I/O functions without requiring the BIOS, operating system, or device driver to reprogram the processor 101 with an updated I/O address when an I/O function has been moved, replaced, or removed. It should be appreciated that the I/O protection map 321 and the interrupt service routine program 322 may be used to emulate any number or types of I/O functions. The I/O protection map 321 and the interrupt service routine program 322 may be implemented by any known technique.

Block 330 represents a third section of the main memory 113. The third section 330 may be used for storing options read only memories (ROMs). The options ROMs may include instructions that configure and run peripherals in the computer system 100. The options ROMs may, for example include instructions that configure and run a video card or a network card.

Block 340 represents a fourth section of the main memory 113. The fourth section 340 may be used for storing BIOS code. The BIOS code may include low-level instructions for running hardware on the computer system. According to an embodiment of the present invention, the BIOS code, along with operating system code and device driver code, may also include I/O address information of I/O functions in the computer system 100 that are provided to the processor 101 (shown in FIG. 1).

Block 350 represents a fifth section of the main memory 113. The fifth section 350 may be used for storing programs that are currently being run by the processor 101. It should be appreciated that FIG. 3 illustrates only an exemplary embodiment of the main memory 113 and that the described instructions and code and additional instructions and code may be stored in the main memory 113 in any known arrangement. It should be appreciated that the main memory may include any number of sections which may be any size.

Figure 4:
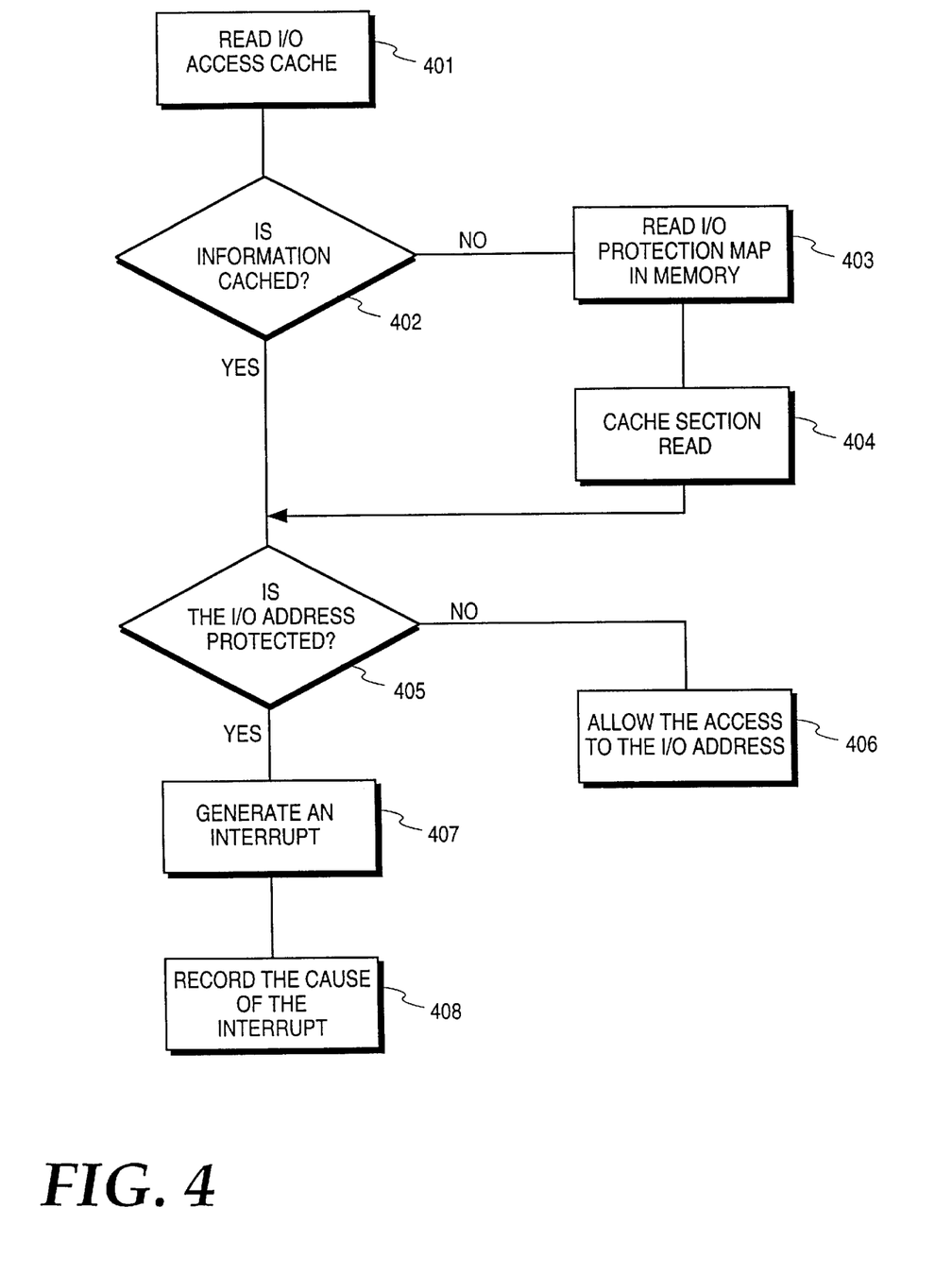
FIG. 4 is a flow chart illustrating a method for managing input/output address accesses according to an embodiment of the present invention.

FIG. 4 is a flow chart illustrating a method for managing I/O address accesses according to an embodiment of the present invention. At step 401, an I/O access cache is read for information regarding the I/O address.

At step 402, a determination is made as to whether the information regarding the I/O address is in the I/O cache. If the information is in the I/O access cache, control proceeds to step 405. If the information is not in the I/O access cache, control proceeds to step 403.

At step 403, a section in the I/O protection map corresponding to the I/O address in main memory is read to retrieve information regarding the I/O address.

At step 404, the section of the I/O protection map read from the main memory is cached in the I/O access cache.

At step 405, a determination is made as to whether the I/O address is protected. If the I/O address is protected, control proceeds to step 407. If the I/O address is not protected, control proceeds to step 406. According to an embodiment of the present invention, the determination is made by reading the information in the section of the I/O protection map corresponding to the I/O address.

At step 406 the access to the I/O address is allowed. According to an embodiment of the present invention, an instruction or a command from the processor is forwarded to the I/O address At step 407, an interrupt is generated to the processor. According to an embodiment of the present invention, a System Management Interrupt is generated to the processor.

At step 408, a message identifying the cause of the interrupt is recorded. According to an embodiment of the present invention, the message is the I/O address which is written in a register in an interrupt recorder. FIG. 4 illustrates one example of a method for managing I/O address accesses according to an embodiment of the present invention. It should be appreciated that some of the steps shown in FIG. 4 may be performed in a different order.

Figure 5:
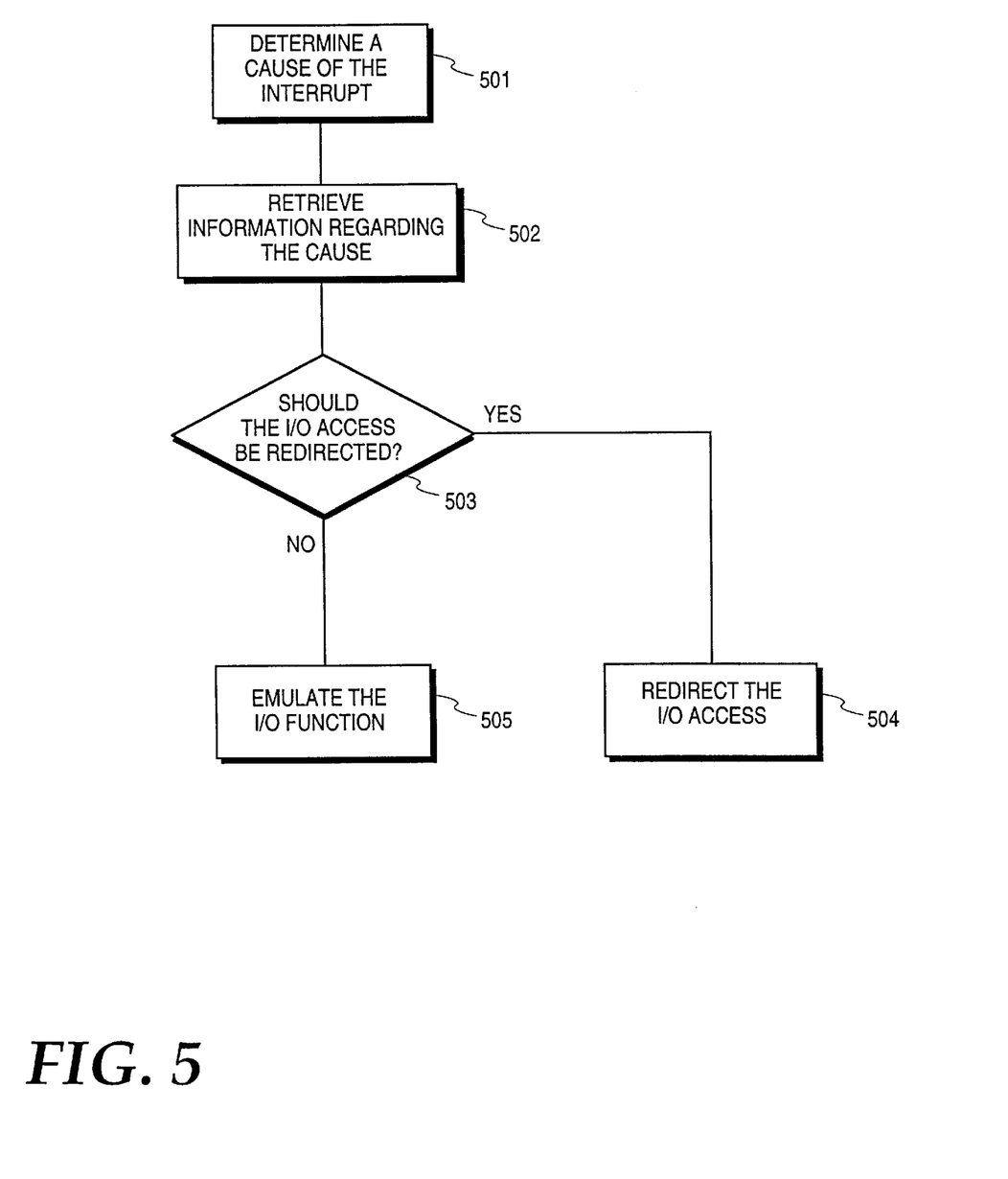
FIG. 5 is a flow chart illustrating a method for handling an interrupt according to an embodiment of the present invention.

FIG. 5 is a flow chart illustrating a method for handling an interrupt according to a first embodiment of the present invention. At step 501, a determination is made as to the cause of the interrupt. According to an embodiment of the present invention, the determination is made by reading information recorded in a status register in an interrupt recorder to determine the cause of the interrupt. The information in the status register may be for example a first I/O address of an I/O function that was attempted to be accessed.

At step 502, information about the first I/O address is retrieved. According to an embodiment of the present invention, information about the first I/O address is retrieved from a table of I/O addresses in a section of main memory reserved for SMM code. The table of I/O addresses may include information as to how the I/O access directed to the first I/O address should be serviced. For example, the table of I/O addresses may indicate that I/O accesses to the first I/O address should be redirected because the BIOS, the operating system, or device driver incorrectly indicated that an I/O function is located at the first I/O address. The table of I/O addresses may include a second address where the I/O access should be redirected to. The table of I/O addresses may indicate that an I/O function should be emulated because the BIOS, the operating system, or the device driver incorrectly indicated that the I/O function is located at the first address.

At step 503, a determination is made as to whether the I/O access should be redirected. If the I/O access should be redirect, control proceeds to step 504. If the I/O access does not need to be redirected, control proceeds to step 505.

At step 504, the I/O access is redirected to the second I/O address.

At step 505, the I/O function is emulated. According to an embodiment of the present invention, an interrupt service routine includes specific instructions on how the I/O function should be emulated.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are, accordingly to be regarded in an illustrative rather than a restrictive sense.

What is claimed is:

1. A bridge/memory controller, comprising:
    an input/output (I/O) address verification unit that determines whether an I/O address received from a processor is protected;
    an interrupt generator, coupled to the I/O address verification unit, that generates an interrupt if the I/O address is protected:, and
    an interrupt recorder, coupled to the address verification unit, that records a cause of the interrupt.

2. The bridge/memory controller of claim 1, wherein the I/O address verification unit determines whether an I/O address is protected by reading information on an I/O protection map.

3. The bridge/memory controller of claim 1 further comprising an I/O access cache that stores a section of an I/O protection map previously read by the I/O address verification unit.

4. The bridge/memory controller of claim 1, wherein the interrupt generator further comprises a pin that outputs a signal when an interrupt is generated.

5. The bridge/memory controller of claim 1, wherein the interrupt recorder comprises a register that records the I/O address.

6. A computer system, comprising:

a bus;

a processor coupled to the bus;

a bridge/memory controller, coupled to the bus, that includes an input/output (I/O) address verification unit that determines whether an I/O address received from a processor is protected, an interrupt generator, coupled to the I/O address verification unit, that generates an interrupt if the I/O address is protected, and an interrupt recorder, coupled to the address verification unit, that records a cause of the interrupt.

7. The computer system of claim 6, wherein the bridge memory controller unit determines whether an I/O address is protected by reading information in an I/O protection map.

8. The computer system of claim 6, wherein the I/O address verification unit further comprises a cache that stores portions of a I/O protection map previously read by the I/O address verification unit.

9. The computer system of claim 6, wherein the interrupt recorder comprises a register that records the I/O address.

10. A method for managing input/output (I/O) address accesses, comprising:

determining at a bridge/memory controller whether an I/O address is protected;

generating an interrupt at the bridge/memory controller if the I/O address is protected; and recording a cause of the interrupt at the bridge/memory controller.

11. The method of claim 10, wherein determining whether the address is protected comprises reading an I/O protection map written in a System Management Memory (SMM).

12. The method of claim 11, further comprising caching a portion of the I/O protection map read.

13. The method of claim 10, wherein recording the cause of the interrupt comprises writing the I/O address in a status register.

14. The method of claim 10, further comprising the step of executing a program that services the interrupt generated.

* * * * *

UNITED STATES PATENT AND TRADEMARK OFFICE
CERTIFICATE OF CORRECTION

PATENT NO. : 6,145,030
DATED : November 7, 2000
INVENTOR(S) : Martwick

It is certified that error appears in the above-identified patent and that said Letters Patent is hereby corrected as shown below:

Column 2,
Line 10, delete "resent", insert -- present --.

Column 3,
Line 67, delete "/O", insert -- I/O --.

Signed and Sealed this

Twenty-second Day of October, 2002

Attest:

Attesting Officer

JAMES E. ROGAN
Director of the United States Patent and Trademark Office